US010089349B2

(12) United States Patent
Chiang et al.

(10) Patent No.: US 10,089,349 B2
(45) Date of Patent: Oct. 2, 2018

(54) METHOD AND ELECTRONIC DEVICE FOR UPDATING THE REGISTERED FINGERPRINT DATASETS OF FINGERPRINT RECOGNITION

(71) Applicant: Egis Technology Inc., Taipei (TW)

(72) Inventors: Yuan-Lin Chiang, Taipei (TW); Yu-Chun Cheng, Taipei (TW)

(73) Assignee: Egis Technology Inc., Taipei (TW)

( * ) Notice: Subject to any disclaimer, the term of this patent is extended or adjusted under 35 U.S.C. 154(b) by 521 days.

(21) Appl. No.: 14/804,259

(22) Filed: Jul. 20, 2015

(65) Prior Publication Data

US 2016/0147825 A1    May 26, 2016

Related U.S. Application Data

(60) Provisional application No. 62/082,822, filed on Nov. 21, 2014.

(30) Foreign Application Priority Data

Mar. 19, 2015  (CN) .......................... 2015 1 0121097

(51) Int. Cl.
*G06F 17/30*         (2006.01)
*G06K 9/00*          (2006.01)

(52) U.S. Cl.
CPC .... *G06F 17/30377* (2013.01); *G06F 17/3053* (2013.01); *G06F 17/30312* (2013.01); *G06K 9/00087* (2013.01)

(58) Field of Classification Search
USPC .......................................... 707/741; 382/124
See application file for complete search history.

(56) References Cited

U.S. PATENT DOCUMENTS

| 5,559,504 A | 9/1996 | Ohhata et al. | |
|---|---|---|---|
| 9,483,682 B1 * | 11/2016 | Chiang | G06F 17/3028 |
| 2006/0210126 A1 * | 9/2006 | Cho | G07C 9/00158 |
| | | | 382/124 |

(Continued)

FOREIGN PATENT DOCUMENTS

| CN | 103003826 A | 3/2013 |
|---|---|---|
| TW | 200428848 | 12/2004 |
| TW | I427544 B | 2/2014 |

*Primary Examiner* — Hung T Vy

(57) ABSTRACT

A method and electronic device for updating registered fingerprint datasets of fingerprint recognition are provided. The method includes the steps of obtaining an verifying fingerprint dataset, wherein an inputting type of the verifying fingerprint dataset is a pressing type and comparing the verifying fingerprint dataset with a plurality of registered fingerprint datasets, wherein the plurality of registered fingerprint datasets are stored in a storage device; when the verifying fingerprint dataset matches one of the plurality of registered fingerprint datasets, determining whether the inputting type of the registered fingerprint dataset is the same as the inputting type of the verifying fingerprint dataset; and if the inputting type of the registered fingerprint dataset is different from the inputting type of the verifying fingerprint dataset, replacing the registered fingerprint dataset with the verifying fingerprint dataset, wherein the inputting type of the registered fingerprint dataset is a swiping type.

12 Claims, 3 Drawing Sheets

(56) References Cited

U.S. PATENT DOCUMENTS

| | | |
|---|---|---|
| 2009/0067679 A1* | 3/2009 | Mainguet ........... G06K 9/00026 |
| | | 382/115 |
| 2010/0060417 A1 | 3/2010 | Niinuma |
| 2010/0082579 A1* | 4/2010 | Rajaram ........... G06F 17/30607 |
| | | 707/706 |
| 2012/0013436 A1 | 1/2012 | Niinuma |
| 2015/0254498 A1* | 9/2015 | Chiang ............... G06F 17/3028 |
| | | 382/126 |

* cited by examiner

100

METHOD AND ELECTRONIC DEVICE FOR UPDATING THE REGISTERED FINGERPRINT DATASETS OF FINGERPRINT RECOGNITION

CROSS REFERENCE TO RELATED APPLICATIONS

This Application claims priority of Provisional Patent Application No. 62/082,822 filed on Nov. 21, 2014, and CN Patent Application No. 201510121097.6 filed on Mar. 19, 2015, the entirety of which is incorporated by reference herein.

BACKGROUND OF THE INVENTION

Field of the Invention

The invention generally relates to registered fingerprint datasets updating technology for fingerprint recognition, and more particularly, to a smart learning method for updating the registered fingerprint datasets.

Description of the Related Art

In recent years, biometric recognition technology has developed greatly. Since security codes and access cards may easily be stolen or lost, more attention has been paid to fingerprint-recognition technology. Fingerprints are unique and never-changing, and each person has multiple fingers for identity recognition. In addition, fingerprints can be obtained easily using fingerprint sensors. Therefore, fingerprint recognition can provide increased security and convenience, and financial security and confidential data can be better protected.

With conventional fingerprint recognition technology, when the user registers his or her finger, the registered fingerprint datasets cannot be modified. Therefore, for fingerprint recognition, the user needs to put his or her finger at the same or similar angle and location on the fingerprint sensor as or to those where the user puts the finger during fingerprint registration. If the user fails to put his or her finger at the same or similar angle and location, the fingerprint sensor will not be able to capture sufficient minutiae for the verification fingerprint data to be compared to and match any of the registered fingerprint datasets, which may cause the fingerprint recognition fail. However, the user may put the finger at different angles and/or locations when he or she puts the finger on the fingerprint sensor for different times. Therefore, during fingerprint recognition, due to the change of the angle and/or location where the user puts his or her finger on the fingerprint sensor, the fingerprint sensor may not be able to capture sufficient minutiae for comparison. As a result, the user may need to put his or her finger on the fingerprint sensor many times in order to pass the fingerprint recognition.

BRIEF SUMMARY OF THE INVENTION

A method and electronic device for updating registered fingerprint datasets using a smart learning method are provided.

An embodiment of the invention provides a method for updating registered fingerprint datasets of fingerprint recognition. The method includes the steps of obtaining an verifying fingerprint dataset, wherein an inputting type of the verifying fingerprint dataset is a pressing type and comparing the verifying fingerprint dataset with a plurality of registered fingerprint datasets, wherein the plurality of registered fingerprint datasets are stored in a storage device. The method further includes the steps of when the verifying fingerprint dataset matches one of the plurality of registered fingerprint datasets, determining whether the inputting type of the registered fingerprint dataset which matches the verifying fingerprint dataset is the same as the inputting type of the verifying fingerprint dataset, wherein the verifying fingerprint dataset matches one of the plurality of registered fingerprint datasets means that the similarity between the verifying fingerprint dataset and the registered fingerprint dataset is higher than a first threshold. The method further includes the steps of replacing the registered fingerprint dataset with the verifying fingerprint dataset, if the inputting type of the registered fingerprint dataset which matches the verifying fingerprint dataset is different from the inputting type of the verifying fingerprint dataset, wherein the inputting type of the registered fingerprint dataset which matches the verifying fingerprint dataset is a swiping type which is different from the pressing type.

An embodiment of the invention provides an electronic device. The electronic device comprises a storage device, a fingerprint sensor and a processing unit. The storage device is configured to store a plurality of registered fingerprint datasets. The fingerprint sensor is configured to obtain a verifying fingerprint dataset by a pressing type. The processing unit is configured to compare the verifying fingerprint dataset with the plurality of registered fingerprint datasets. When the verifying fingerprint dataset matches one of the plurality of registered fingerprint datasets, the processing unit will determine whether the inputting type of the registered fingerprint dataset which matches the verifying fingerprint dataset is the same as the inputting type of the verifying fingerprint dataset, wherein the verifying fingerprint dataset matches one of the plurality of registered fingerprint datasets means that the similarity between the verifying fingerprint dataset and the registered fingerprint dataset is higher than a first threshold. If the inputting type of the registered fingerprint dataset which matches the verifying fingerprint dataset is different from the inputting type of the verifying fingerprint dataset, the processing unit will replace the registered fingerprint dataset with the verifying fingerprint dataset, wherein the inputting type of the registered fingerprint dataset which matches the verifying fingerprint dataset is a swiping type which is different from the pressing type.

Other aspects and features of the invention will become apparent to those with ordinary skill in the art upon review of the following descriptions of specific embodiments of methods and devices.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
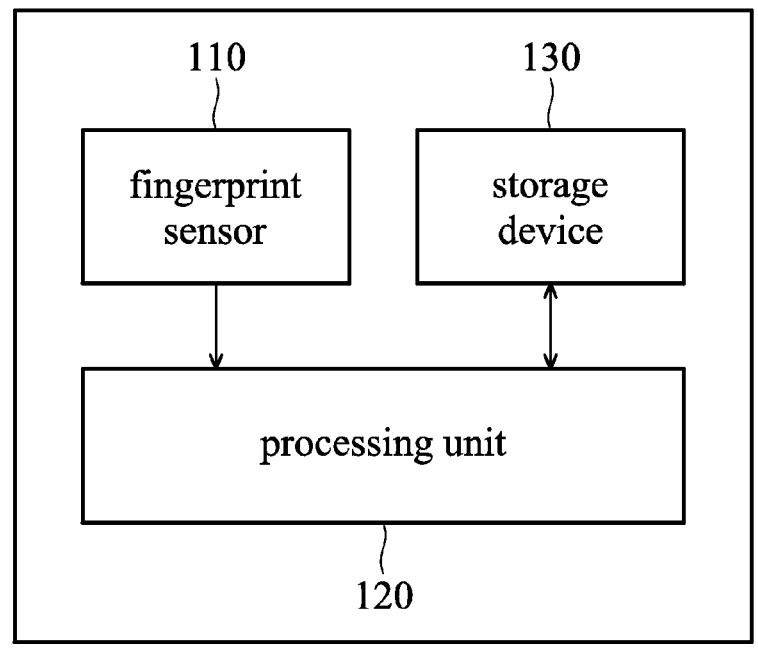
FIG. 1 is a block diagram of an electronic device 100 according to an embodiment of the invention.

FIG. 1 is a block diagram of an electronic device 100 according to an embodiment of the invention. In an embodiment of the invention, the electronic device 100 is an electronic device with a fingerprint recognition function, e.g. a mobile phone, a smartphone, a tablet computer, a note book, and so on. As shown in FIG. 1, the electronic device 100 comprises a fingerprint sensor 110, a processing unit 120 and a storage device 130. FIG. 1 presents a simplified block diagram in which only the elements relevant to the invention are shown. However, the invention should not be limited to what is shown in FIG. 1.

In the embodiments of the invention, for fingerprint registration, the user needs to swipe his or her finger over the fingerprint sensor 110 one or more times. After the user swipes his or her finger over the fingerprint sensor 110, a plurality of swiping frames will be generated and then the processing unit 120 will select the effective and valuable reference frames from the swiping frames and generate a registered fingerprint dataset for fingerprint recognition according to the reference frames. Namely, every time after the user successfully swipes the finger over the fingerprint sensor 110, a registered fingerprint dataset will be generated accordingly. In addition, the processing unit 120 will store all registered fingerprint datasets in the storage device 130. Note that all of the original registered fingerprint datasets are generated by user's swiping his or her finger over the fingerprint sensor 110. However, when some of the original registered fingerprint datasets stored in the storage device 130 are replaced with fingerprint datasets generated by user's pressing his or her finger on the fingerprint sensor 110, the registered fingerprint datasets stored in the storage device 130 will include the fingerprint datasets generated by user's pressing his or her finger on the fingerprint sensor 110.

For fingerprint recognition, the user will put his or her finger on the fingerprint sensor 110. Then, the processing unit 120 will generate a verifying frame according to the sensing result of the fingerprint sensor 110 and then generate a verifying fingerprint dataset according to the verifying frame. After the processing unit 120 generates the verifying fingerprint dataset, the processing unit 120 will compare the verifying fingerprint dataset with the registered fingerprint datasets and generate a fingerprint recognition result according to the comparison result.

When a comparison score corresponding to the verifying fingerprint dataset and one of the registered fingerprint datasets is higher than a first threshold, the processing unit 120 will determine the verifying fingerprint dataset is verified and the verifying fingerprint dataset passes the fingerprint recognition. The processing unit 120 may compare the verifying fingerprint dataset with each of the registered fingerprint datasets. When the similarity between the verifying fingerprint dataset and the registered fingerprint dataset is higher, the comparison score will be higher as well. When the verifying fingerprint dataset is verified, the processing unit 120 will determine whether to store the verified verifying fingerprint dataset into the storage device 130 in order to include the verified verifying fingerprint dataset to be a new registered fingerprint dataset or replace the registered fingerprint dataset which matches the verified verifying fingerprint dataset with the verified verifying fingerprint dataset. In an embodiment of the invention, when the verifying fingerprint dataset is verified, the processing unit 120 will determine whether the storage space of the storage device 130 is full first. If the storage space of the storage device 130 is not full, the processing unit 120 will store the verified verifying fingerprint dataset in the storage device 130 to include the verified verifying fingerprint dataset to be a new registered fingerprint dataset.

If the storage space of the storage device 130 is full, the processing unit 120 will determine whether the comparison score corresponding to the verified verifying fingerprint dataset and the registered fingerprint dataset which matches the verified verifying fingerprint dataset is higher than a second threshold, wherein the second threshold is higher than or equal to the first threshold. If the comparison score is lower than the second threshold, the processing unit 120 will delete the verified verifying fingerprint dataset and not store the verified verifying fingerprint dataset in the storage device 130.

Figure 2:
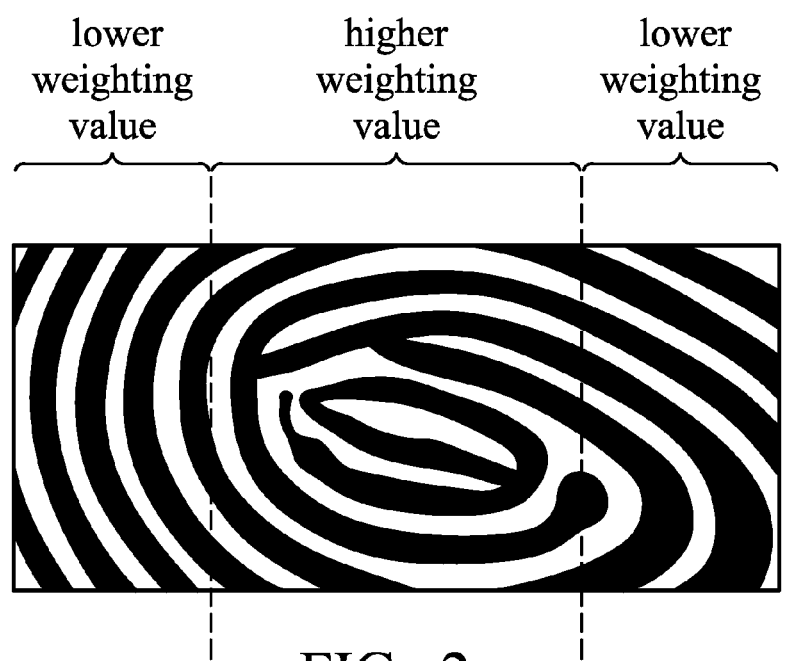
FIG. 2 is a schematic diagram illustrating different weighting values for different areas of a fingerprint dataset according to an embodiment of the invention.

In an embodiment of the invention, the processing unit 120 computes the comparison score according to an overlapped area between the verified verifying fingerprint dataset and the registered fingerprint dataset. When the overlapped area between the verified verifying fingerprint dataset and the registered fingerprint dataset is larger, the comparison score will be higher. In an embodiment of the invention, different parts of the registered fingerprint dataset may correspond to different weighting values. For example, as shown in FIG. 2, if the registered fingerprint dataset is generated by user's swiping his or her finger over the fingerprint sensor 110, two lateral areas of the registered fingerprint dataset will be more likely to have distortions. Therefore, the two lateral areas of the registered fingerprint dataset will correspond to lower weighting value, and the central area of the registered fingerprint dataset will correspond to a higher weighting value. In the embodiment of the invention, the processing unit 120 will compute the comparison score according to the different weighting values corresponding to different parts of the registered fingerprint dataset.

If the comparison score is higher than the second threshold, the processing unit 120 will further determine whether the registered fingerprint dataset which matches the verified verifying fingerprint dataset is generated by user's swiping his or her finger over the fingerprint sensor 110 (i.e. the inputting type of the registered fingerprint dataset is a swiping type). The verifying fingerprint dataset is generated by user's pressing his or her finger on the fingerprint sensor 110 (i.e. the inputting type of the verifying fingerprint dataset is a pressing type), and the fingerprint dataset generated by user's pressing his or her finger on the fingerprint sensor 110 has higher reliability than the fingerprint dataset generated by user's swiping his or her finger over the fingerprint sensor 110. Therefore, if the registered fingerprint dataset which matches the verified verifying fingerprint dataset is generated by user's swiping his or her finger over the fingerprint sensor 110, the processing unit 120 will replace the registered fingerprint dataset with the verified verifying fingerprint dataset.

If the registered fingerprint dataset which matches the verified verifying fingerprint dataset is generated by user's pressing his or her finger on the fingerprint sensor 110, the processing unit 120 will further determine whether the image quality of verified verifying fingerprint dataset is better than the registered fingerprint dataset. If the image quality of the verified verifying fingerprint dataset is better than the registered fingerprint dataset, the processing unit 120 will replace the registered fingerprint dataset with the verified verifying fingerprint dataset. If the image quality of the verified verifying fingerprint dataset is not better than the registered fingerprint dataset, the processing unit 120 will further determine whether the registered fingerprint dataset corresponds to a higher reference frequency. In an embodiment of the invention, the reference frequency means the number of matching between the registered fingerprint dataset and a verifying fingerprint dataset generated by user's pressing his or her finger on the fingerprint sensor 110 for fingerprint recognition. If a registered fingerprint dataset corresponds to a higher reference frequency, it means this registered fingerprint dataset has a higher reference value. If a registered fingerprint dataset corresponds to lower reference frequency, it means this registered fingerprint dataset is seldom matched and adopted in the fingerprint recognition. For example, when the reference frequency of a registered fingerprint dataset is higher than or equal to one fifth of the highest reference frequency, it means that this registered fingerprint dataset has a relatively higher reference frequency. In other words, if the reference frequency is lower than one fifth of the highest reference frequency, it means this registered fingerprint dataset has a relatively lower reference frequency.

If the processing unit 120 determines that the registered fingerprint dataset corresponds to a lower reference frequency, i.e. after the reference frequency of the registered fingerprint dataset is compared with the highest reference frequency, the reference frequency corresponds to the lower reference frequency, the processing unit 120 will replace the registered fingerprint dataset with the verified verifying fingerprint dataset. In other words, if the reference frequency corresponds to the higher reference frequency, the processing unit 120 will not replace the registered fingerprint dataset with the verified verifying fingerprint dataset because the registered fingerprint dataset has a higher reference value.

Figure 3A:
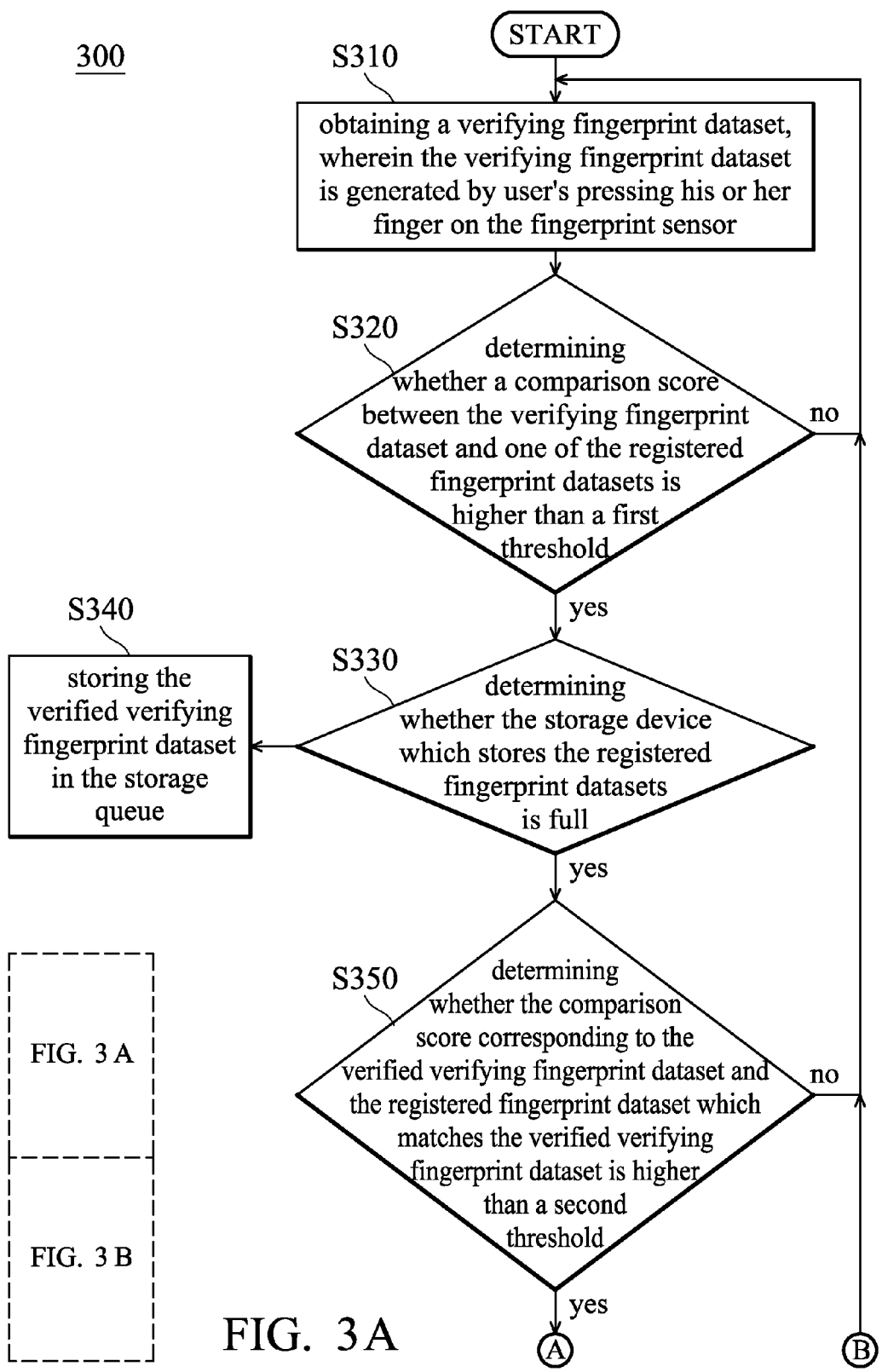
FIGS. 3A-3B illustrate a method for updating the registered fingerprint datasets of fingerprint recognition according to an embodiment of the invention.
Figure 3B:
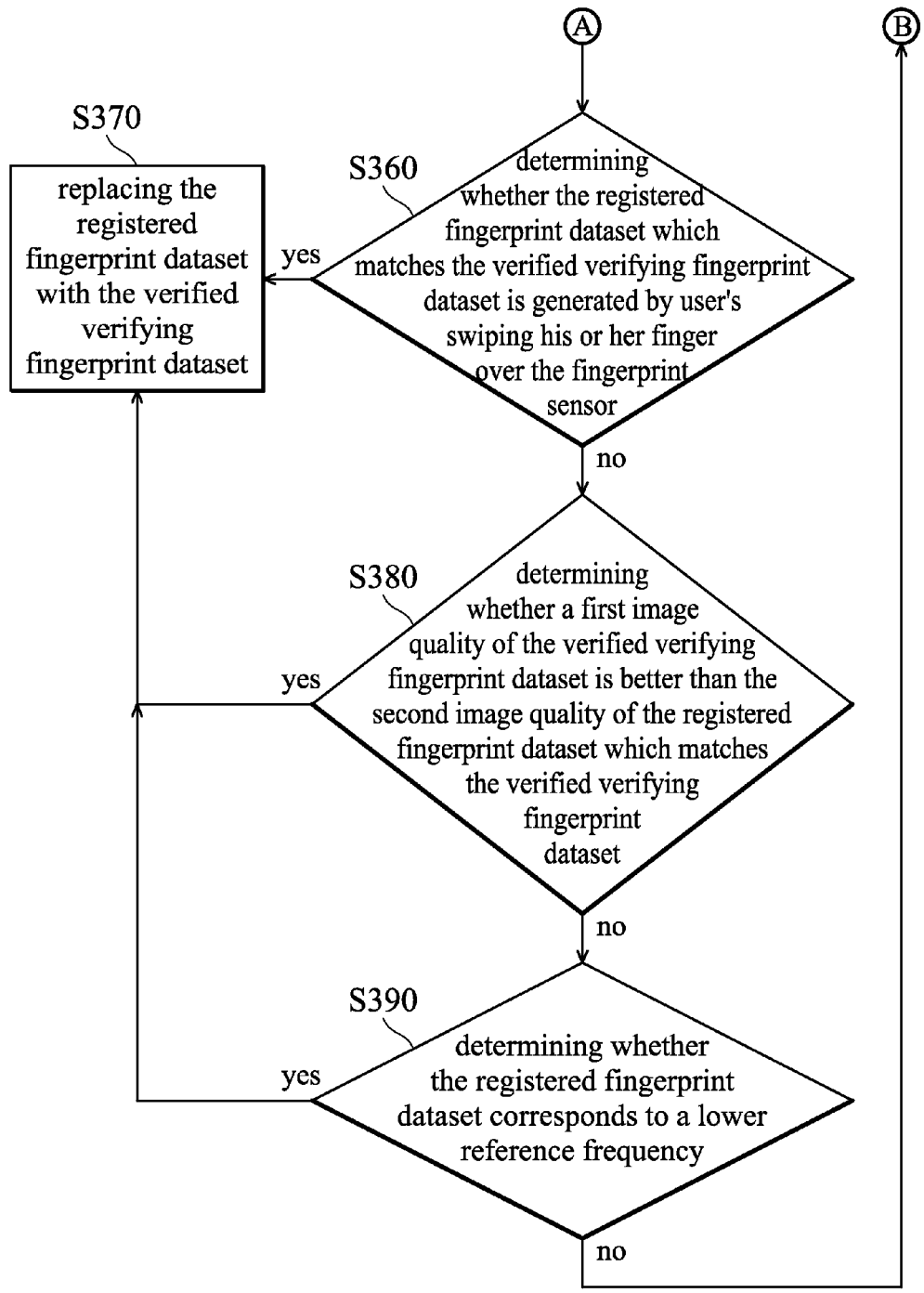

FIGS. 3A-3B illustrate a method for updating registered fingerprint datasets used for fingerprint recognition according to an embodiment of the invention. The method for updating the registered fingerprint datasets of fingerprint recognition is applied to the electronic device 100. As shown in FIGS. 3A-3B, in step S310 of the flow chart 300, the electronic device 100 obtains an inputting fingerprint dataset, wherein the inputting fingerprint dataset is generated by user's pressing his or her finger on the fingerprint sensor 110 (i.e. the inputting type of the inputting fingerprint dataset is a pressing type). In step S320, the electronic device 100 determines whether a comparison score between the verifying fingerprint dataset and one of the registered fingerprint datasets is higher than a first threshold. When the comparison score between the verifying fingerprint dataset and one of the registered fingerprint datasets is higher than the first threshold, it means the verifying fingerprint dataset is verified and step S330 will be performed. When the comparison score between the verifying fingerprint dataset and each of the registered fingerprint datasets is lower than the first threshold, it means the verifying fingerprint dataset fails the verification, and the method will return to step S310. In step S330, when the verifying fingerprint dataset is verified, the electronic device 100 will determine whether the storage device 130 which stores the registered fingerprint datasets is full. If the storage device 130 is not full, step S340 will be performed. In step S340, the electronic device 100 stores the verified verifying fingerprint dataset in the storage device 130. If the storage device 130 is full, step S350 will be performed.

In step S350, the electronic device 100 determines whether the comparison score corresponding to the verified verifying fingerprint dataset and the registered fingerprint dataset which matches the verified verifying fingerprint dataset is higher than a second threshold. If the comparison score is higher than the second threshold, step S360 will be performed. If the comparison score is not higher than the second threshold, the electronic device 100 will delete the verified verifying fingerprint dataset and the method will return to step S310.

In step S360, the electronic device 100 determines whether the registered fingerprint dataset which matches the verified verifying fingerprint dataset is generated by user's swiping his or her finger over the fingerprint sensor 110. If the registered fingerprint dataset which matches the verified verifying fingerprint dataset is generated by user's swiping his or her finger over the fingerprint sensor 110 (i.e. the inputting type of the registered fingerprint dataset is a swiping type), step S370 will be performed. In step S370, the electronic device 100 replaces the registered fingerprint dataset with the verified verifying fingerprint dataset. If the registered fingerprint dataset which matches the verified verifying fingerprint dataset is generated by user's pressing his or her finger on the fingerprint sensor 110, step S380 will be performed. In step S380, the electronic device 100 determines whether a first image quality of the verified verifying fingerprint dataset is better than the second image quality of the registered fingerprint dataset which matches the verified verifying fingerprint dataset. If the first image quality is better than the second image quality, step S370 will be performed and the electronic device 100 will replace the registered fingerprint dataset with the verified verifying fingerprint dataset. If the first image quality is not better than the second image quality, step S390 will be performed. In step S390, the electronic device 100 determines whether the registered fingerprint dataset corresponds to a lower reference frequency. If the processing unit 120 determines the registered fingerprint dataset corresponds to a lower reference frequency after comparing the reference frequency of the registered fingerprint dataset with the highest reference frequency, step 370 will be performed and the electronic device 100 will replace the registered fingerprint dataset with the verified verifying fingerprint dataset. If the processing unit 120 determines the registered fingerprint dataset does not correspond to a lower reference frequency after comparing the reference frequency of the registered fingerprint dataset with the highest reference frequency, the processing unit 120 will delete the verified verifying fingerprint dataset and the method will return to step S310.

In the methods of the embodiments of the invention, the electronic device 100 can update the registered fingerprint datasets by using a smart learning method to make the registered fingerprint datasets more adaptable to the user's operation habit and increase the success rate of fingerprint recognition.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. Alternatively, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

Reference throughout this specification to "one embodiment" or "an embodiment" means that a particular feature, structure, or characteristic described in connection with the embodiment is included in at least one embodiment of the invention, but do not denote that they are present in every embodiment. Thus, the appearances of the phrases "in one embodiment" or "in an embodiment" in various places throughout this specification are not necessarily referring to the same embodiment of the invention.

The above paragraphs describe many aspects. Obviously, the teaching of the invention can be accomplished by many methods, and any specific configurations or functions in the disclosed embodiments only present a representative condition. Those who are skilled in this technology will understand that all of the disclosed aspects in the invention can be applied independently or be incorporated.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A method for updating registered fingerprint datasets of fingerprint recognition, comprising:
    obtaining, by a fingerprint sensor, a verifying fingerprint dataset, wherein an inputting type of the verifying fingerprint dataset is a pressing type;
    comparing, by a processing unit, the verifying fingerprint dataset with a plurality of registered fingerprint datasets, wherein the plurality of registered fingerprint datasets are stored in a storage device;
    when the verifying fingerprint dataset matches one of the plurality of registered fingerprint datasets, determining, by the processing unit, whether an inputting type of the registered fingerprint dataset which matches the verifying fingerprint dataset is a swiping type, wherein the verifying fingerprint dataset matches one of the plurality of registered fingerprint datasets means similarity between the verifying fingerprint dataset and the registered fingerprint dataset is higher than a first threshold; and
    if the inputting type of the registered fingerprint dataset which matches the verifying fingerprint dataset is the swiping type, replacing, by the processing unit, the registered fingerprint dataset with the verifying fingerprint dataset.

2. The method of claim 1, further comprising:
    determining whether the storage device is full when the verifying fingerprint dataset matches one of the plurality of registered fingerprint datasets; and
    determining whether a comparison score between the verifying fingerprint dataset and the registered fingerprint dataset is higher than a second threshold if the storage device is full, wherein the second threshold is higher than or equal to the first threshold; and
    deleting the verifying fingerprint dataset if the comparison score is lower than the second threshold.

3. The method of claim 2, further comprising:
    storing the verifying fingerprint dataset in the storage device if the storage device is not full.

4. The method of claim 1, further comprising:
    determining whether a first image quality of the verifying fingerprint dataset is better than a second image quality of the registered fingerprint dataset which matches the verifying fingerprint dataset if the inputting type of the registered fingerprint dataset is the pressing type; and
    replacing the registered fingerprint dataset with the verifying fingerprint dataset if the first image quality is better than the second image quality.

5. The method of claim 1, further comprising:
    determining whether the registered fingerprint dataset which matches the verifying fingerprint dataset corresponds to a lower reference frequency; and
    replacing the registered fingerprint dataset with the verifying fingerprint dataset if the registered fingerprint dataset corresponds to a lower reference frequency.

6. The method of claim 1, wherein different parts of the registered fingerprint dataset which matches the verifying fingerprint dataset corresponds to different weighting values, and a comparison score is computed according to an overlapped area between the verifying fingerprint dataset and the registered fingerprint dataset and the weighting values corresponding to the area.

7. An electronic device, comprising:
    a storage device, configured to store a plurality of registered fingerprint datasets;
    a fingerprint sensor, configured to obtain a verifying fingerprint dataset, wherein an inputting type of the verifying fingerprint dataset is a pressing type; and
    a processing unit, coupled to the storage device and the fingerprint sensor, configured to compare the verifying fingerprint dataset with the plurality of registered fingerprint datasets,
    wherein when the verifying fingerprint dataset matches one of the plurality of registered fingerprint datasets, the processing unit determines whether an inputting type of the registered fingerprint dataset which matches the verifying fingerprint dataset is a swiping type, wherein the verifying fingerprint dataset matches one of the plurality of registered fingerprint datasets means similarity between the verifying fingerprint dataset and the registered fingerprint dataset is higher than a first threshold; and
    wherein if the inputting type of the registered fingerprint dataset which matches the verifying fingerprint dataset is the swiping type, the processing unit replaces the registered fingerprint dataset with the verifying fingerprint dataset.

8. The electronic device of claim 7, wherein when the verifying fingerprint dataset matches one of the plurality of registered fingerprint datasets, the processing unit determines whether the storage device is full; if the storage device is full, the processing unit determines whether a comparison score between the verifying fingerprint dataset and the registered fingerprint dataset is higher than a second threshold, wherein the second threshold is higher than or equal to the first threshold; and if the comparison score is lower than the second threshold, the processing unit deletes the verifying fingerprint dataset.

9. The electronic device of claim 8, wherein if the storage device is not full, the processing unit stores the verifying fingerprint dataset in the storage device.

10. The electronic device of claim 7, wherein if the inputting type of the registered fingerprint dataset which matches the verifying fingerprint dataset is the pressing type, the processing unit determines whether a first image quality of the verifying fingerprint dataset is better than a second image quality of the registered fingerprint dataset; and if the first image quality is better than the second image quality, the processing unit replaces the registered fingerprint dataset with the verifying fingerprint dataset.

11. The electronic device of claim 7, wherein the processing unit further determines whether the registered fingerprint dataset which matches the verifying fingerprint dataset corresponds to a lower reference frequency, and if the registered fingerprint dataset corresponds to a lower reference frequency, the processing unit replaces the registered fingerprint dataset with the verifying fingerprint dataset.

12. The electronic device of claim 7, wherein different parts of the registered fingerprint dataset which matches the verifying fingerprint dataset corresponds to different weighting values, and a comparison score is computed according to an overlapped area between the verifying fingerprint dataset and the registered fingerprint dataset and the weighting values corresponding to the area.

* * * * *